(12) United States Patent
Jörder et al.

(10) Patent No.: US 6,527,834 B1
(45) Date of Patent: Mar. 4, 2003

(54) FILTER FOR GASEOUS MEDIA

(75) Inventors: Kurt Jörder; Klaus Veeser; Mathias Pudleiner; Dirk Dantz, all of Weinheim (DE)

(73) Assignee: Firma Carl Freudenberg, Weinheim (DE)

( * ) Notice: Subject to any disclaimer, the term of this patent is extended or adjusted under 35 U.S.C. 154(b) by 0 days.

(21) Appl. No.: 09/441,149

(22) Filed: Nov. 12, 1999

(30) Foreign Application Priority Data

Nov. 13, 1998 (DE) .......................................... 198 52 386

(51) Int. Cl.$^7$ ................................................. B03C 3/64
(52) U.S. Cl. ......................... 96/68; 55/524; 55/DIG. 5; 95/59; 95/61; 95/285; 96/69
(58) Field of Search ........................ 96/69, 68; 55/524, 55/528, DIG. 39, DIG. 5; 95/59, 61, 285

(56) References Cited

U.S. PATENT DOCUMENTS

| 4,419,107 A | * | 12/1983 | Roydhouse ..................... 95/59 |
| 5,112,677 A | * | 5/1992 | Tani et al. ............. 55/DIG. 39 |
| 5,221,573 A | * | 6/1993 | Baigas, Jr. ............. 55/DIG. 39 |
| 5,244,482 A | * | 9/1993 | Hassenboehler, Jr. et al. ........................... 55/528 |
| 5,350,443 A | * | 9/1994 | von Blucher et al. .. 55/DIG. 39 |
| 5,626,820 A | * | 5/1997 | Kinkead et al. .......... 95/285 X |
| 5,759,394 A | * | 6/1998 | Rohrbach et al. ...... 55/DIG. 39 |
| 5,830,810 A | * | 11/1998 | Cohen ...................... 55/524 X |

FOREIGN PATENT DOCUMENTS

| DE | 2317354 | * 10/1974 | .................... 96/69 |
| EP | 0 847 787 | 6/1998 | |
| GB | 1 531 984 | 11/1978 | |
| JP | 53-53074 | * 5/1978 | ............ 55/DIG. 39 |
| JP | 57-128498 | 8/1982 | |
| JP | 9-206522 | 8/1997 | |
| JP | 9-220418 | 8/1997 | |
| WO | 93/25745 | 12/1993 | |

* cited by examiner

Primary Examiner—Richard L. Chiesa
(74) Attorney, Agent, or Firm—Kenyon & Kenyon

(57) ABSTRACT

A filter made of nonwoven fabric, paper or the like for gaseous media, having an electrically conductive coating made of a conductive substance of pulverizable materials, in particular from electrically conductive carbon-black particles and/or powdery metal particles or other pulverized materials, the carbon-black particles or metal particles being fixed to the filter fibers with the aid of binding agents, and the conductive coating being applied in a reticulated manner on the filtering layer.

22 Claims, No Drawings

FILTER FOR GASEOUS MEDIA

FIELD OF THE INVENTION

The invention relates to filters made of nonwoven fabric, paper or the like for gaseous media, having an electrically conductive coating made of a conductive substance of pulverizable materials.

DESCRIPTION OF RELATED ART

The use of filters for removing dust from gaseous media is generally widespread. Thus, surface filters are utilized in various formats, for example, as bag filters, filter cartridges or filter plates. The filtering layer is very frequently formed from nonwoven fabric or paper. The effectiveness of such a filter is influenced by the cake of dust forming on the untreated air side. As the cake of dust increases on the surface of the filter, a higher separation of dust is achieved. At the same time, however, permeability of the filter to air is reduced, and the pressure difference of the filter increases. When the pressure difference exceeds a predetermined limiting value, it is necessary to clean the dust cake and the embedded dust from the filtering layer. This cleaning is usually effected by a pressure surge in the reverse direction of the direction of flow during the filter operation.

For certain filter utilization purposes, the filtering layers can be furnished with electrically conductive substances. Thus, for example, only antistatic and grounded filter elements are permissible for the extraction of explosive dust. This prevents sparks which are produced electrostatically from triggering an explosion. Consequently, the filter components which are electrostatically non-conductive per se must be provided with an antistatic finish. For example, it is known that the filtering layer is provided with a metallic coating or even a coating made of conductive carbon-black particles. For instance, the metallic coating can be applied to the filtering layer by vapor-deposition. In this case, the required surface resistance is already achieved with very thin coatings. The porosity and the air permeability of the filtering medium are scarcely influenced. However, the metallic coatings are very unstable with respect to abrasive stress or the effect of chemicals. Therefore, their application range is highly restricted. In addition, in the customary vapor-deposition methods, only the top surface of the filter medium is provided with a metallic coating, so that the volume resistance assumes values which are too high when working with dense or thicker materials.

It may be that, in comparison to the metallic layer, the full-surface impregnation of the filter with conductive carbon black and a suitable binding-agent system has the advantage of good resistance to abrasion and chemicals; however, filtering properties such as air permeability or porosity of the filter medium are significantly reduced when working with this finishing. Thus, the serviceability of the filter for removing dust is limited. The energy consumption for the operation of the filter is increased and the service life is reduced. In addition, in the case of many dusts, this finishing increases the adherence to the filtering medium to the extent that the ability for regeneration is altered negatively or no longer exists at all.

SUMMARY OF THE INVENTION

The object of the present invention is to produce a filter from nonwoven fabric, paper or the like for gaseous media which exhibits high serviceability. The intention is for the abrasive stress to be as low as possible and the resistance to chemicals to be as high as possible. The filter should be capable of regeneration and have a long service life. There is also a striving for high porosity and high air permeability. A primary goal is the antistatic finish, so that the filter can even be used when cleaning gases having explosive dust.

These and other objects of the invention are achieved by the invention which provides a filter made of nonwoven fabric, paper or the like for gaseous media, having an electrically conductive coating made of a conductive substance of pulverizable materials, in particular from electrically conductive carbon-black particles and/or powdery metal particles or other pulverized materials, the carbon-black particles or metal particles being fixed to the filter fibers with the aid of binding agents, and the conductive coating being applied in a reticulated manner on the filtering layer.

DETAILED DESCRIPTION OF THE INVENTION

A filter made of nonwoven fabric is preferably used as the filtering layer. This filter is provided with an electrically conductive coating of a conductive substance made of pulverizable materials, particularly electrically conductive carbon black and/or powdery metal particles or other suitable pulverizable materials as well, the particles being fixed to the filter fibers with the aid of binding agents, and the coating being applied in a reticulated manner on the filter surface. Instead of the closed layer of the electrically conductive substance customary until now, a coating provided with openings is applied in a reticulated or screen-like formation on the nonwoven fabric layer. The openings in the coating make it possible to retain a satisfactory permeability to air, accompanied at the same time by a good antistatic finish. The familiar advantages of a high abrasion resistance, resistance to chemicals and regeneration ability of the filter are retained. In order to satisfy demands for a low surface resistance, the pattern of the conductive coating is applied all the way in both dimensions on the filtering layer. Also necessary for this purpose is that the conductive mixture be applied to a sufficient depth into the filtering layer, so that the transport of electric charges is also possible through the filtering layer. Here, in a further refinement of the invention, the carbon-black or metal-particle coating is introduced into the filtering layer at a depth of at least 50% of the filtering-layer thickness. The particles are embedded at a lesser or greater depth in the filtering layer depending upon the application purpose and also as a function of the filtering-layer thickness. If applicable, provision is made for a 100% penetration.

The use of carbon-black dust is beneficial in many application cases. The content of carbon-black particles relative to the binding agent is 10 to 80%, preferably 30 to 50%. Tests have shown that a sufficient antistatic effect is achieved with these portions. Particularly good results were achieved when working with a content of carbon-black particles of 33.5%.

The average primary particle size of the carbon-black particles is 15 to 30 nm. This fineness of the carbon-black particles permits good penetration of the particles into the filtering layer, and good electrical conductivity later on.

Slight differences result when using metal particles compared to carbon-black particles. Thus, the content of metal particles relative to the binding agent is selected to be between 20 and 99%; preferably, the content is 70–90%. The average primary particle size of the metal particles is 0.5–20 $\mu$m, preferably 1–5 $\mu$m.

Copper, zinc, aluminum and/or silver powders have proven to be suitable metal particles. The suitable metal is selected in view of the field in which the filter is used.

Polyvinyl acetates, polyvinyl fluorides, polyurethanes, polyacrylates or butadiene copolymers are used as binding agents. The binding agents should yield a good bond between the particles and the filter fibers.

Although carbon-black particles have proven to be particularly favorable for reasons of cost, and metal particles are primarily possible for special cases, provision is also made within the scope of the inventive idea for the use of conductive organic substances. To be named in particular here are electrically conductive polymers made of polyacetylene, polyphenylene, polythiophene or polypyrrole.

Finally, it is also possible to produce the electrically conductive substance as a mixture of carbon black, metal and/or organic particles with a suitable binding agent.

The smaller the reticulated surface coverage with the conductive layer, naturally the greater is the permeability to air. However, the electric efficiency is reduced. Tests have shown that when using carbon-black particles, it is beneficial if the reticulated surface coverage with the conductive carbon-black coating is 25 to 70% of the filter surface. When using metal-powder coatings, the reticulated surface coverage with the conductive metal-powder coating can be less, and lies in the range between 5 and 70% of the filter surface.

For most application purposes, it is sufficient if the solids content of the substance on the filter surface is 1 to 15 g/m$^2$, preferably 2 to 5 g/m$^2$. These values relate to the use of carbon-black particles. The use of metal particles or the additional use of metal particles shifts the solids content of the substance in the direction of the lower values.

As a rule, it is sufficient if the filtering layer is coated on one side with the conductive substance. As already explained earlier, in this case the penetration of the filtering layer by the particles plays an important role. However, it is also possible to apply the conductive layer on both sides of the filter. Due to this, the layers are reliably interconnected. In a few cases, it is also possible to apply the conductive layers on both sides congruently. In this manner, the highest possible rate of air flow is achieved, accompanied by the greatest possible conductivity.

The air permeability through the filter is determined by various factors. However, in each case it is better than with a full-sided coating of the filter. In order to give sufficient scope to the inventive idea, an improvement of air permeability of at least 15% is striven for relative to the full-sided coated filter.

Using a silk-screen printing process, a filter made of a nonwoven fabric is imprinted with a paste made of a carbon-black content of 33.5%, an acrylate binding agent of 52% and a thickening agent made of acrylic-acid ester of about 12%. This solids content is diluted by dissolving in water to produce a 10% solution. The nonwoven fabric layer is made of 100% polyester fibers.

The penetration of the nonwoven fabric layer is 85%. The attained resistance value of the filter is less than $10^8 \Omega$. The surface coverage with the conductive carbon-black layer is 43%. The air permeability is 330 m$^3$/m$^2$/h, measured at 200 Pa pressure difference in accordance with DIN 53887. If the same nonwoven fabric is provided with the conductive mixture over the full surface, the value of the air permeability sinks to 270 m$^3$/m$^2$/h. Overall, therefore, an improvement in air permeability of 22% was achieved relative to the surface-area pressure.

What is claimed is:

1. A filter for gaseous media comprising a filtering fiber layer of nonwoven fabric or paper having an electrically conductive coating made of a particulate conductive material selected from the group consisting of electrically conductive carbon-black particles, powdery metal particles and pulverized conductive materials and mixtures thereof, the particulate conductive material being fixed to the filter fibers by a binding agent, and the conductive coating being applied in a reticulated manner on the layer, said coating thereby having a reticulated formation with openings to retain both permeability and an antistatic finish.

2. The filter according to claim 1, wherein the particulate conductive material penetrates the filtering layer at a depth of at least 50% of the filtering layer thickness.

3. The filter according to claim 1, wherein the particulate conductive material is carbon-black particles having a content relative to the binding agent of 10 to 80%.

4. The filter according to claim 1, wherein the particulate conductive material is carbon-black particles having a content relative to the binding agent of 30 to 50%.

5. The filter according to claim 1, wherein the particulate conductive material is carbon-black particles having a content of 33.5%.

6. The filter according to claim 1, wherein the particulate conductive material is carbon-black particles having an average primary particle size of 15–30 nm.

7. The filter according to claim 1, wherein the particulate conductive material is metal particles having a content relative to the binding agent of 70–90%.

8. The filter according to claim 1, wherein the particulate conductive material is metal particles having a content relative to the binding agent of 20–99%.

9. The filter according to claim 8, wherein the average primary particle size of the metal particles is 0.5–20 μm.

10. The filter according to claim 8, wherein the average primary particle size of the metal particles is 1–5 μm.

11. The filter according to claim 8, wherein the metal particles are selected from the group consisting of: copper, zinc, aluminum and silver powder, and mixtures thereof.

12. The filter according to claim 1, wherein the binding agent is selected from the group consisting of polyvinyl acetates, polyvinyl chlorides, polyurethanes, polyacrylates and butadiene copolymers and mixtures thereof.

13. The filter according to claim 1, wherein conductive organic substances with binding agents are utilized.

14. The filter according to claim 13, wherein the organic substances are electrically conductive polymers made of polyacetylene, polyphenylene, polythiophene or polypyrrole.

15. The filter according to claim 1, wherein the particulate conductive material is a mixture of carbon-black particles, metal particles and organic particles with a binding agent.

16. The filter according to claim 1, wherein the reticulated surface coverage with the conductive carbon-black layer amounts to 25–70% of the filter surface.

17. The filter according to claim 1, wherein the reticulated surface coverage with the conductive metal-powder layer amounts to 5–70% of the filter surface.

18. The filter according to claim 1, wherein the solids content of the substance on the filtering layer is 1–15 g/m$^2$.

19. The filter according to claim 1, wherein the solids content of the substance on the filtering layer is 2–5 g/m$^2$.

20. The filter according to claim 1, wherein the conductive coating is applied to the filter on both sides.

21. The filter according to claim 1, wherein the conductive coatings on both sides are congruent.

22. The filter according to claim 1, wherein the permeability of the filter to air is increased by at least 15% relative to a full-sided coated filter.

* * * * *